(12) United States Patent
Gebhart et al.

(10) Patent No.: US 7,779,063 B2
(45) Date of Patent: Aug. 17, 2010

(54) AUTOMATIC BENEFIT ANALYSIS OF DYNAMIC CLUSTER MANAGEMENT SOLUTIONS

(75) Inventors: Alexander Gebhart, Akazienweg (DE); Erol Bozak, Vinzentiusstrasse (DE)

(73) Assignee: SAP AG, Walldorf (DE)

( * ) Notice: Subject to any disclaimer, the term of this patent is extended or adjusted under 35 U.S.C. 154(b) by 265 days.

(21) Appl. No.: 11/833,906

(22) Filed: Aug. 3, 2007

(65) Prior Publication Data
US 2009/0037429 A1  Feb. 5, 2009

(51) Int. Cl.
*G06F 15/16* (2006.01)
(52) U.S. Cl. .................................................. 709/201
(58) Field of Classification Search ............... 709/201
See application file for complete search history.

(56) References Cited

U.S. PATENT DOCUMENTS

| | | | |
|---|---|---|---|
| 6,192,401 B1* | 2/2001 | Modiri et al. ............ | 709/220 |
| 2003/0204273 A1* | 10/2003 | Dinker et al. ............ | 700/48 |
| 2003/0204509 A1* | 10/2003 | Dinker et al. ............ | 707/100 |
| 2005/0138084 A1* | 6/2005 | Azagury et al. .......... | 707/200 |
| 2007/0260716 A1* | 11/2007 | Gnanasambandam et al. ..................... | 709/223 |
| 2008/0275935 A1* | 11/2008 | Mohindra et al. ........ | 709/201 |
| 2009/0037571 A1* | 2/2009 | Bozak et al. ............ | 709/224 |

OTHER PUBLICATIONS

Norris, J.; Coleman, K.; Fox, A.; Candea, G., "OnCall: defeating spikes with a free-market application cluster," Autonomic Computing, 2004. Proceedings. International Conference on , vol., No., pp. 198-205, May 17-18, 2004.*
Wei-Peng Chen; Hou, J.C.; Lui Sha, "Dynamic clustering for acoustic target tracking in wireless sensor networks," Mobile Computing, IEEE Transactions on , vol. 3, No. 3, pp. 258-271, Jul.-Aug. 2004.*

* cited by examiner

*Primary Examiner*—Ajay Bhatia
(74) *Attorney, Agent, or Firm*—Mintz, Levin, Cohn, Ferris, Glovsky & Popeo, P.C.

(57) ABSTRACT

Methods and apparatus, including computer program products, are provided for determining whether there is a benefit to implementing a dynamic cluster system rather than a static cluster system. In one aspect, there is provided a computer-implemented method. The method may include accessing, at a static cluster system, information representative of the static cluster system and accessing information representative of a dynamic cluster system. Based on the accessed information, a value may be determined, such that the value represents a benefit (e.g., an indication of usefulness or worth as well as a lack of usefulness or worth) of implementing the dynamic cluster system rather than the static cluster system. The determined value may be provided to a user interface, so that a user may decide whether to implement the dynamic cluster system rather than a static cluster system. Related apparatus, systems, methods, and articles are also described.

14 Claims, 3 Drawing Sheets

AUTOMATIC BENEFIT ANALYSIS OF DYNAMIC CLUSTER MANAGEMENT SOLUTIONS

FIELD

The present disclosure generally relates to distributed computing. More particularly, the present disclosure relates to determining the benefit of implementing a dynamic cluster of computers.

BACKGROUND

Computers have now become an integral part of our society both in business and in residential settings. Almost every business of sufficient size in Germany, the United States, and other developed countries have one or more computers to assist them in running their businesses. Similarly, many families in those countries now have computers at home that are used to run various applications including games.

Some attribute the popularity of the computers to the Internet. The Internet provides people with a ready access to vast amounts of data. Many people now get their news, sports, stock, entertainment, and other information primarily from the Internet. Businesses have also embraced the Internet. The Internet provides the opportunity for computers to communicate instantly with other computers or individuals. Business processes that were once restricted to intranets and their users are now moving to the Internet. Accordingly, companies are moving more and more of their data to electronic forms. In addition, companies have amassed huge amounts of data in an effort to understand their business, improve performance, and build stronger employee, customer, and partner relationships.

Today, distributed computing systems are widely used by various organizations to accommodate the ever-increasing demand for the computer resources from consumers and businesses alike. In a distributed computing system, nodes (e.g., computers, processors, servers, etc.) are grouped or clustered to perform certain functions. Generally, a cluster is a collection of computer nodes that work together to perform a function, so that in many respects the cluster can be viewed as a single computer. The nodes of a cluster are usually coupled by a network, such as the Internet or an intranet. The cluster may be managed either statically (i.e., static cluster management) or dynamically (i.e., dynamic cluster management).

A static cluster is a group of application servers that participate in some form of workload management. With a static cluster, the application servers that are in a cluster are static, and once defined, all the application servers in the cluster are usually started or stopped all at once. In short, the application servers are statically assigned to a specific cluster of nodes.

In contrast, dynamic clusters are controlled by autonomic controllers (or managers) that optimize the performance of the cluster. Moreover, a dynamic cluster can start and stop individual instances of application servers as required. A dynamic cluster may also dynamically balance the workloads of the nodes of the cluster based on performance information collected from cluster nodes. Consequently, dynamic clusters optimize the use of the processing capabilities of the computers (or processors) in the clusters. When compared to a single computer or even a static cluster, the dynamic cluster may provide increased performance and overall lower total cost of ownership by better utilizing the existing processing capabilities of the cluster. However, even though there are many advantages to dynamic clusters, many have not transitioned from the more prevalent static cluster management to dynamic cluster management.

One example of a dynamic computing system environment is provided by SAP, AG's NetWeaver Adaptive Computing infrastructure. The Adaptive Computing infrastructure enables the dynamic assignment of hardware resources to serve specific application services. In this way, SAP NetWeaver enables an Adaptive Computing infrastructure to provide business solutions based on SAP NetWeaver running at peak efficiency. In most cases, SAP's Adaptive Computing provides lower total cost of ownership by providing better server utilization, higher service levels, and standardized building blocks for the infrastructure.

SUMMARY

The subject matter disclosed herein provides methods and apparatus, including computer program products, for analyzing the benefit of implementing dynamic cluster management rather than static cluster management.

In one aspect, there is provided a computer-implemented method for determining the benefit of implementing a dynamic cluster system rather than a static cluster system. The method may include accessing, at a static cluster system, information representative of a static cluster system and accessing information representative of a dynamic cluster system. Based on the accessed information, a value may be determined, such that the value represents a benefit of implementing the dynamic cluster system rather than the static cluster system. The determined value may be provided to a user interface, so that a user may decide whether to implement the dynamic cluster system rather than a static cluster system. Related apparatus, systems, methods, and articles are also described.

Variations may include one or more of the following features. The cost associated with the static cluster system may be determined based on the following equation: $C_{trad} = (n*T_{tdg}*C_t) + (n*T_{tci}*C_t) + (n*T_{tdi}*C_t)$, wherein n represents a quantity of moves detected in the static cluster system; $T_{tdg}$ represents a measured time to move a database instance of the static cluster system; $C_t$ represents a cost value per unit of time; $T_{tci}$ represents a measured time to move a central instance in the static cluster system; and $T_{tdi}$ represents a measured time to move a dialog instance in the static cluster system. The cost associated with the dynamic cluster system may be determined based on the following equation: $C_{ada} = (n*T_{adb}*C_t) + (n*T_{aci}*C_t) + (n*T_{adi}*C_t) + C_{once}$, wherein $T_{adb}$ represents a measured time to move a database in a dynamic cluster system; $T_{aci}$ represents a measured time to move a central instance in a dynamic cluster system; and $T_{adi}$ represents a measured time to move a dialog instance in a dynamic cluster system. The measured times may be the same or different. The cost reduction may be determined based on the following equation: $C_{red} = C_{trad} - C_{ada}$. The registry of the static cluster system may be accessed to obtain information of activity within the static cluster system. Information representative of another static cluster system comparable to the static cluster system may be accessed. The registry of the dynamic cluster system may be accessed to obtain information of activity within the dynamic cluster system. Information representative another dynamic cluster system comparable to the static cluster system may be accessed.

The subject matter described herein may be implemented to realize the advantage of providing to a user information indicative of whether there is any benefit to implementing a dynamic cluster system rather than a dynamic cluster system. Moreover, since the transition from static to dynamic is so complex, making a benefit determination correspondingly complex (as well as difficult), the subject matter described herein provides a mechanism to provide information regarding the benefit.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

Figure 1:
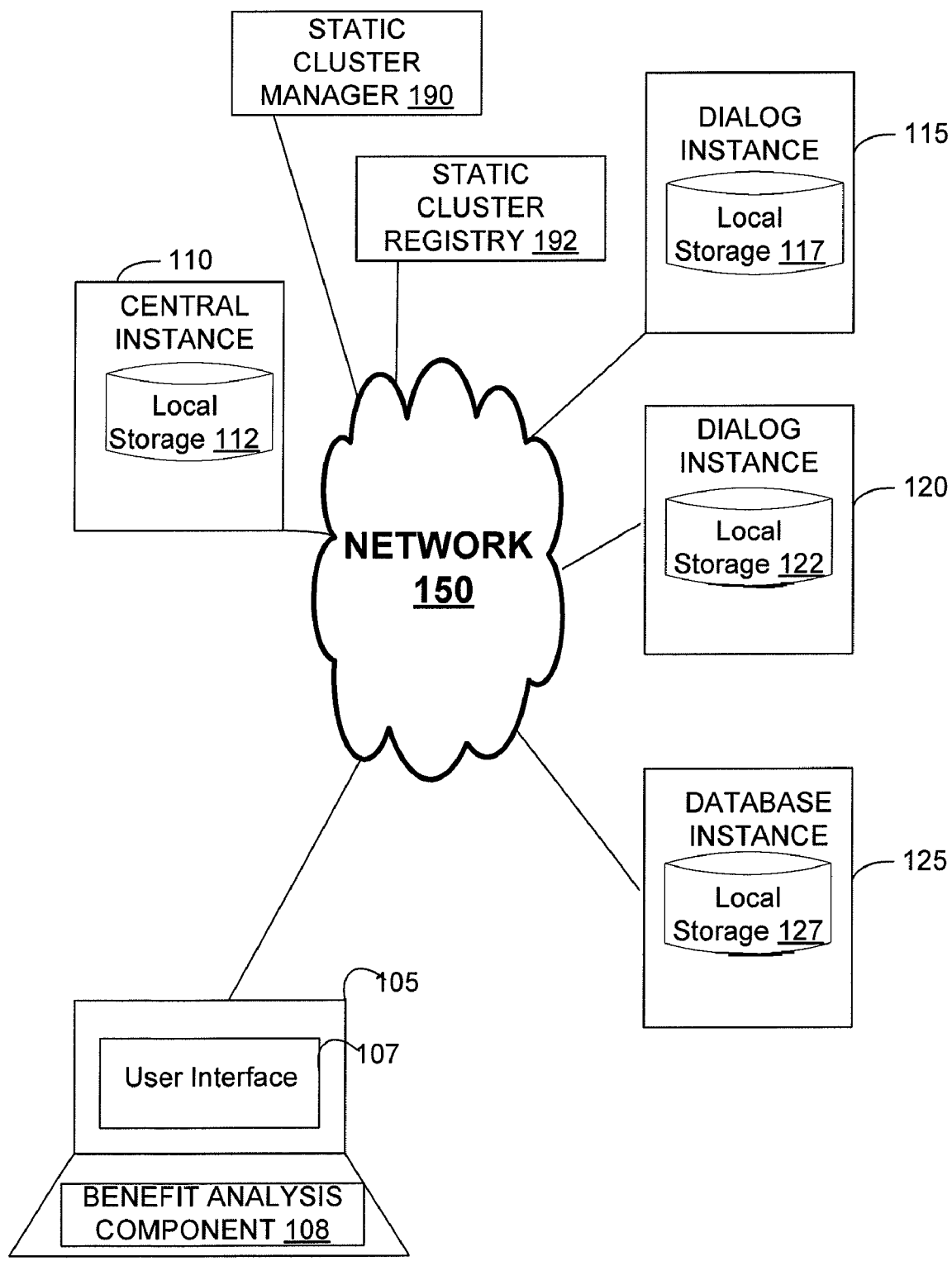
FIG. 1 depicts a block diagram of a static cluster system.

Like labels are used to refer to same or similar items in the drawings

DETAILED DESCRIPTION

FIG. 1 depicts a static cluster system 100 that is statically managed (e.g., with a static cluster management system). As noted above, a cluster is a collection of computer nodes (e.g., computers, servers, processors, etc.) that work together. The static cluster system 100 includes components (also referred to as "portions" or "nodes") of the cluster 110, 115, 120, and 125 coupled through network 150.

The static cluster system 100 also includes a static cluster manager 190 for managing static cluster system 100. One example of such a static cluster manager is NetWeaver Administrator, commercially available from SAP AG.

The static cluster system 100 also includes a static cluster registry 192 for the cluster. An example of a registry is the System Landscape Directory (SLD) available from SAP, AG. The static cluster registry 192 includes information describing the clusters. In some implementations, activity associated with static cluster system 100 is logged with a timestamp at static cluster registry 192. The information at static cluster registry 192 may include one or more of the following: a list of clusters, a system identifier for each of the clusters, physical Internet Protocol (IP) addresses of each node of a cluster, virtual IP addresses of each node of a cluster, Media Access Control (MAC) addresses of each node of a cluster, a log with timestamps describing activity (e.g., additions, deletions, and modifications, etc.) to static cluster system 100, capabilities (e.g., memory, processing capability, operating system, and bandwidth available to network 150) associated with each node of a cluster, locally available disk space at each node of a cluster, and software available at each node of a cluster.

The static cluster system 100 also includes a computer 105 including a user interface 107 for accessing a benefit analysis component 108 for determining the benefit associated with implementing a dynamic cluster system rather than a static cluster system.

The benefit analysis component 108 may also perform one or more of the following functions: receive location information (e.g., an IP address) of any static registries or static cluster managers for which a benefit analysis is to be determined; access static cluster manager 190 and static cluster registry 192 to gather information associated with static cluster system 100 as well as gather information associated with a dynamic cluster system; determine whether components of a cluster have moved; calculate a benefit implementing a dynamic cluster system rather than a static cluster system; and provide any information regarding such a benefit to user interface 107. The benefit analysis component 108 may be implemented as a program, group of programs, and/or small binary object (e.g., an applet) that performs one or more functions associated with determining whether there is any benefit to implementing a dynamic cluster system rather than a static cluster system, as described further below.

The cluster 110 includes a central instance statically configured on that cluster. The central instance is an application server that controls the computational processes among nodes of a cluster and may include a message server for communications. The central instance may also have an associated system identifier (SID) identifying the cluster to static cluster manager 190 and static cluster registry 192.

The dialog instances are also application servers configured on cluster nodes 115 and 120. For example, the dialog instance may be an application server providing applications, such as word processing, spreadsheets, user interfaces, a customer relationship management application, an enterprise resource planning application, a product lifecycle management application, a supply chain management application, a supplier relationship management application, and the like. When a client computer accesses a customer relationship management (CRM) application at cluster node 115, the CRM application runs on that cluster node. If another client computer accesses cluster node 115, another CRM application is served on that cluster. In this example, the cluster node 115 wraps each instance of the CRM application, so that the two CRM applications can run independently regardless of whether they run on the same or different nodes within the cluster.

System 100 also depicts an instance of a database application server on a cluster node 125.

The clusters nodes 110-125 may each include local storage 112, 117, 122, and 127 for storing applications, such as the applications served to a client computer (e.g., computer 105 and the like) by the cluster nodes.

When new hardware is introduced into static system 100, a user may be required to manually de-install each of the instances and then separately reload those instances on each new node. In a large enterprise network, the de-installation and installation can take hours, days, and even weeks. Moreover, any activity associated with the new hardware is logged in static cluster registry 192. The static cluster registry 192 also logs any activity associated with any other changes (e.g., moves, upgrades, etc.) to the static cluster system 100.

Figure 2:
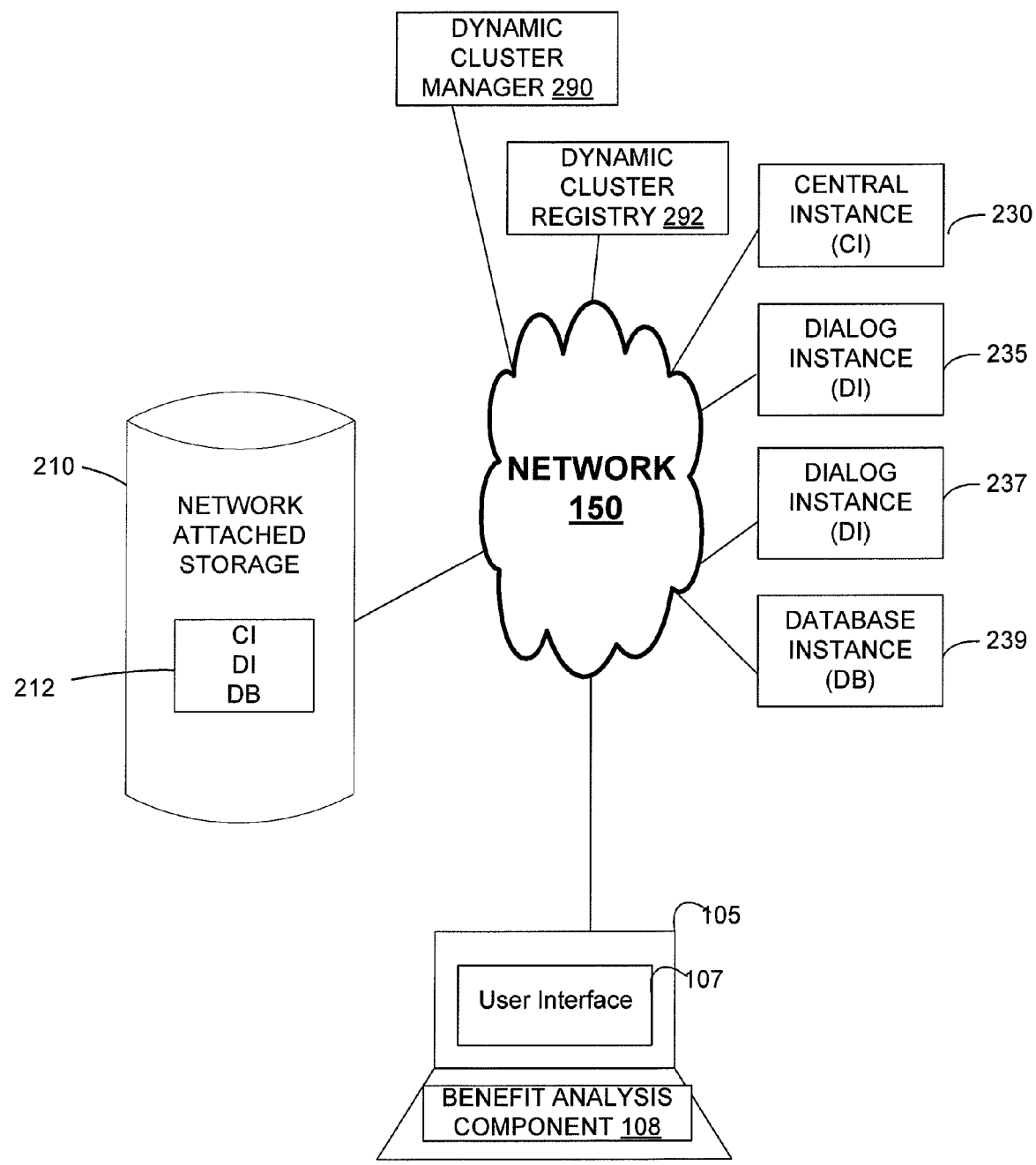
FIG. 2 depicts a block diagram of a dynamic cluster system.

FIG. 2 depicts a dynamic cluster system 200. The dynamic cluster system 200 includes a network attached server 210, cluster nodes 230-239, and a dynamic cluster manager 290, such as SAP's Adaptive Computing for managing system 200. The dynamic cluster system 200 also includes a dynamic cluster registry 292. An example of such a registry is the System Landscape Directory (SLD) available from SAP, AG.

Dynamic cluster management, e.g., SAP's Adaptive Computing, is a technology used to, for example, start, stop, and relocate entire clusters or nodes of clusters (e.g. application servers, databases, central instances, and dialog instances). Dynamic cluster management technology may reduce a customer's total cost of ownership (TCO), when compared to static clusters. The benefit analysis component 108 provides an indication of whether there is a TCO reduction for a particular customer, and if so, how much. The benefit analysis component 108 thus provides a mechanism to determine whether to implement dynamic cluster management technology rather than static cluster management technology. Moreover, since the transition from static to dynamic cluster management is so complex, the benefit analysis component 108 enables determining whether there is a benefit to making the complex transition.

The dynamic cluster registry 292 includes information describing the clusters including nodes of dynamic cluster 200. Such information may include one or more of the following: a list of clusters, a list of nodes of clusters, a system identifier for each of the clusters, physical IP addresses of each node of a cluster, virtual IP addresses of each node of a cluster, MAC addresses of each node of a cluster, a log with timestamps describing any activity (e.g., additions, deletions, modifications, etc.) to the cluster, capabilities (e.g., memory, processing capability, operating system, and bandwidth available to network 150) associated with each node of a cluster, locally available disk space at each node of a cluster, and software available at each node of a cluster.

The dynamic cluster manager 290 may also include or be coupled to computer 105 including user interface 107 and benefit analysis component 108. The dynamic cluster manager 290 enables the addition and removal of computing resources with minimal administrative effort. The dynamic cluster manager 290 may also manage workloads and assign instances of applications to a computing resource, such as one or more nodes. The dynamic cluster manager 290 may also build connections between computing and storage resources, provide a transport layer for virtualization, and support different network topologies, such as TCP/IP, iSCSI, and Fibre Channel.

To determine the benefit of implementing dynamic cluster management rather than static cluster management, benefit component 108 compares the costs associated with a static cluster to the costs of implementing a dynamic cluster. For example, the costs associated with the onerous task of moving components of a cluster (as used herein the phrase "components of a cluster" refers to a part of a cluster, a whole cluster, and/or sets of clusters, and is used interchangeably with the phrases "cluster node" and "node of a cluster") within static cluster system 100 may be compared with the costs associated with implementing dynamic cluster system 200.

To determine the costs, benefit analysis component 108 may access archived (as well as current) data representative of the static cluster system 100 by gathering data from static cluster system 100 including static cluster registry 192. The benefit analysis component 108 may also access archived (as well as current) data representative of the dynamic cluster system 200 by gathering data from dynamic cluster system 200 and dynamic cluster registry 292. In cases where no information is available for dynamic cluster system 200 (e.g., when a customer has not yet implemented dynamic cluster system 200), benefit component 108 may access actual or simulated information from another, comparable dynamic cluster system.

Moreover, benefit analysis component 108 may access the following information: how much time it takes to move each part of a static cluster (e.g., de-installation and installation of each cluster node, such as DB instances, central instances, dialog instances, application servers, and the like) to a new set of machines; how much time it takes to move each part of a dynamic cluster (e.g., moving each cluster component, such as DB instances, central instances, dialog instances, application servers, and the like) to a new set of machines; and the cost of switching a static cluster system to a dynamic cluster system including time and required hardware for the switch.

Benefit component 108 uses the accessed information to determine an indication of the cost (or saving) associated with a static cluster system and to determine an indication of the cost (or savings) associated with implementing a dynamic cluster system. The determined cost (or savings) may be provided to user interface 107, so that the benefit of a static cluster system can be compared to the benefit of a dynamic cluster. If there is a cost (or savings) associated with implementing a dynamic cluster system, benefit component 108 may provide the benefit information to user interface 107.

In some implementations, benefit analysis component 108 uses the accessed information noted above to determine a cost associated with the use of static cluster system 100 based on Equation 1 described below. The benefit analysis component 108 may also use the accessed information noted above to determine a cost associated with dynamic cluster system 200 using Equation 2 described below. The benefit analysis component 108 may determined whether there is any benefit to implementing a dynamic cluster system rather than a static one using Equation 3 described below.

Figure 3:
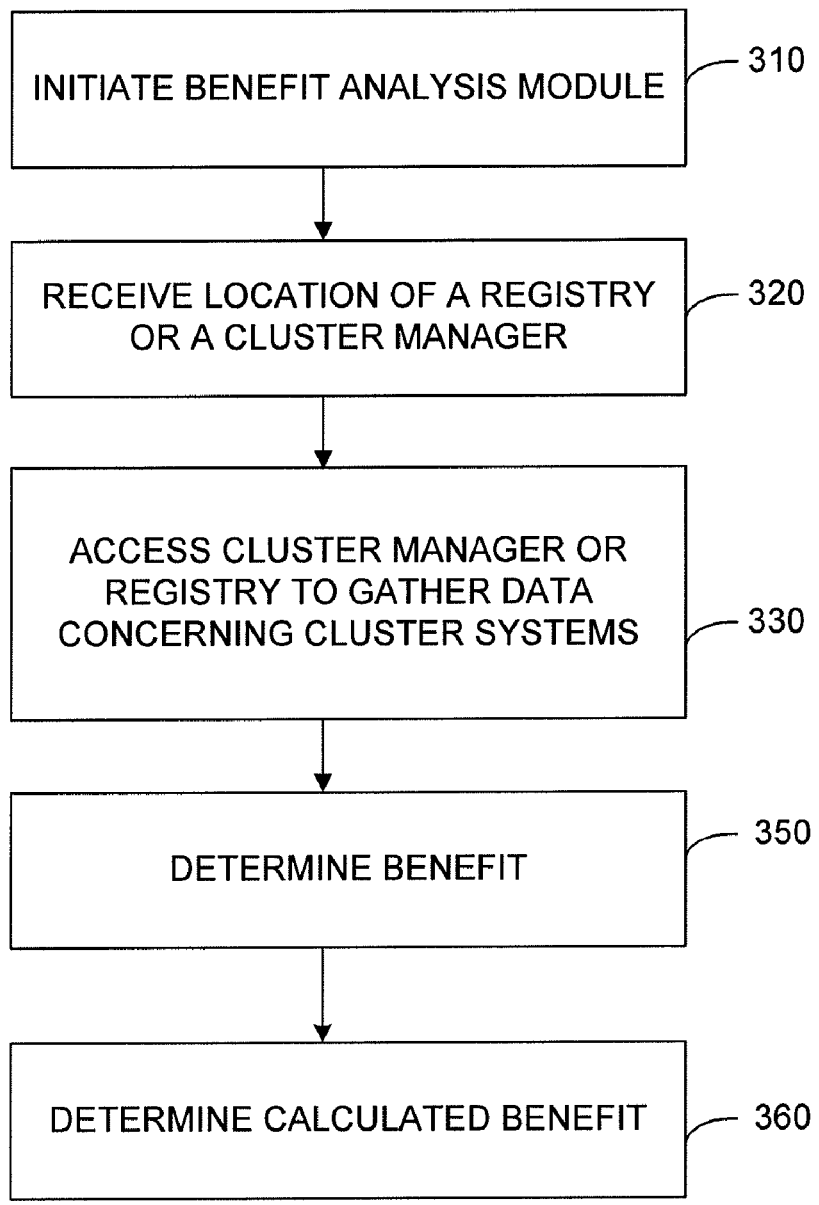
FIG. 3 depicts a process of determining the benefit associated with implementing a dynamic cluster system.

FIG. 3 depicts a process for determining the benefit of implementing dynamic cluster management. As used herein, benefit may be represented in any manner that indicates usefulness, worth, or lack of useful (or worth). For example, benefit may be represented as a cost, a savings, or any other indication.

At 310, benefit component 108 is initiated to start the process. For example, a user of user interface 107 may access benefit component 108 at a server or Web site and execute benefit component 108. In some implementations, benefit component 108 is part of another program, such as a user interface or a cluster management system. Benefit component 108 may be implemented as a service, such as a Web service or program, at a server or Web site. A service is a software component that is capable of being accessed via standard network protocols, such as Simple Object Access Protocol (SOAP) over Hyper Text Transfer Protocol (HTTP). Although benefit component 108 is depicted at computer 105, benefit component 108 may be located anywhere and in multiple locations.

At 320, benefit component 108 receives the location (e.g., IP address) of the cluster registries or cluster managers associated with any systems being analyzed by benefit component 108. For example, a user of user interface 107 may provide the location of static cluster manager 190 and cluster registry 192, and, if available, dynamic cluster manager 290 and dynamic registry 292. Alternatively, benefit component 108 may determine their location programmatically by discovering them without user input by using, for example, UDDI (Universal Description Discovery and Integration).

At 330, benefit component 108 accesses one or more of the following: cluster manager 190, cluster registry 192, dynamic cluster manager 390, and dynamic registry 392. This access enables benefit component 180 to gather information concerning one or more of static cluster system 100 and dynamic cluster system 200. The gathered information includes information in the registries describing the so-called "landscape" of systems 100 and 200. As noted above, the registries 192 and 292 may each include information, such as a list of clusters, a system identifier for each of the clusters, physical IP addresses of each node of a cluster, virtual IP addresses of each node of a cluster, MAC addresses of each node of a cluster, a log with timestamps describing any activity (e.g., additions, deletions, modifications, etc.) to the cluster, capabilities (e.g., memory, processing capability, and bandwidth) associated with each node of a cluster, local available disk space at each node of a cluster, and software available at each node of a cluster.

Moreover, registries 192 and 292 may include information representative of moves of components of static cluster systems 100 and dynamic cluster system 200. Registries 192 and 292 may also include how much time it takes to move each part of a static cluster (e.g., de-installation and installation of each cluster component, such as DB instances, central instances, dialog instances, application servers, and the like) to a new set of machines; how much time it takes to move each part of a dynamic cluster (e.g., moving each cluster component, such as DB instances, central instances, dialog instances) to a new set of machines; and the cost of switching a static cluster system to a dynamic cluster system including the time and required hardware for the switch.

With the aforementioned information, benefit component 108 is able to detect how often components of a cluster have moved. For example, when a cluster system is installed with system identifier (SID) "C1," the cluster C1 may include a database instance, a central instance, and ten dialog instances, with each cluster component running on a computer with a corresponding IP address. When new piece of hardware (e.g., nodes) is introduced to cluster C1, a user may de-install the cluster components from the old nodes and install the components on the new hardware. As the move takes place, all changes are monitored and logged by a registry or a cluster manager. For example, in the registry, each computer and each cluster component registers each time the hardware is switched and re-installed. Such registration information is kept in the registry (in some cases permanently) even when the same SID is used. As a consequence, if the same SID is associated with a different IP address and/or a different MAC address and only SID C1 is active (i.e., recognized by the registry and system manager as currently active), then the cluster C1 has moved. Moreover, since the activities logged in the registry include timestamps, benefit component 108 may determined when, how often, and how long the move took as well as what components were moved. In some implementations, benefit component 108 accesses, gathers, and monitors such information from the registry and system manager to determine whether a move has occurred.

In some implementations, login information (e.g., a login identifier and password) may be required to access static cluster manager 190 and static cluster registry 192.

Benefit component 108 may also determine how much time it takes to move each component of a static system 100 installed in a cluster (e.g., de-installation of each cluster component, such as central instances, database instances, and dialog instances, and installing them on new nodes).

Benefit component 108 may also determine using the information obtained in 330 how much time it takes to move each component of a dynamic system 200 installed in a cluster and installing them on new nodes. In cases where a registry does not include actual information regarding moves within a dynamic cluster system 200, benefit component 108 may use information representative of such a move (e.g., information from other, comparable systems and/or simulated information). In the case of dynamic system 200, the move may include selecting a portion of a cluster, a whole cluster, and/or sets of clusters, shutting down the selected components of the cluster, and starting the components of the cluster at their new destination.

At 350, benefit component 108 determines the cost associated with a traditional static cluster using the information accessed in 330. In some implementations, the following equation is used:

$$C_{trad}=(n*T_{tdg}*C_t)+(n*T_{tci}*C_t)+(n*T_{tdi}*C_t)$$ [Equation 1], wherein $C_{trad}$ represents the cost associated with static clusters; n represents the number of moves detected at 340; "*" represents multiplication; $T_{tdg}$ represents the time to move a database in hours in a static cluster; $C_t$ represents the cost per hour; $T_{tci}$ represents the time to move a central instance in hours in a static cluster; $T_{tdi}$ represents time to move a dialog instance in hours in a static cluster.

At 350, benefit component 108 also determines the cost associated with a dynamic cluster using the information accessed in 330. In some implementations, the following equation is used:

$$C_{ada}=(n*T_{adb}*C_t)+(n*T_{aci}*C_t)+(n*T_{adi}*C_t)+C_{once}$$ [Equation 2], wherein $C_{ada}$ represents the cost associated with dynamic clusters; n represents the number of moves detected at 340; $T_{adb}$ represents the time to move a database in hours in a dynamic cluster; $C_t$ represents the cost per hour; $T_{aci}$ represents the time to move a central instance in hours in a dynamic cluster; and $T_{adi}$ represents time to move a dialog instance in hours in a dynamic cluster.

At 350, benefit component 108 may also determine a total cost of ownership based on the cost associated with a static cluster and the cost associated with a static cluster. In some implementations, the following equation is used:

$$C_{red}=C_{trad}-C_{ada}$$ [Equation 3], wherein $C_{red}$ represents any cost reduction with implementing a dynamic cluster system rather than a static cluster system. The $C_{red}$ may be considered a total cost of ownership reduction when a dynamic system is implemented rather than a static cluster system. The benefit component 108 may provide $C_{red}$ as well as $C_{trad}$ and $C_{ada}$ to user interface 107 for display. For example, a bar graph may be presented at user interface 107, so that the bar graph compares $C_{trad}$ and $C_{ada}$.

In some implementations, rather than use a registry, benefit component 108 installs agent software to monitor and gather information in system 100 and/or system 200.

In some implementations, information gathered in 340 may be used to determine a break-even point. For example, if the activity continues at its present rate, the break-even point (e.g., $C_{trad}$ equals $C_{ada}$) represents how long it takes to recover the cost of implementing dynamic cluster management.

Referring again to FIG. 1, user interface 107 may be implemented as any interface that enables a user to interact with an application or program, such as transitioning component 108, through network 150. The user interface 107 may be implemented as a browser, such as Netscape Navigator or the like, or any other type of graphical user interface. In some implementations, SAP Web Dynpro (commercially available from SAP AG, Walldorf, Germany) may be used as a model-based development environment for generating user interface 107, although other development environments may be used.

Network 150 may be any type of communications mechanism and may include, alone or in any suitable combination, the Internet, a telephony-based network, a local area network (LAN), a wide area network (WAN), a dedicated intranet, wireless LAN, an intranet, a wireless network, a bus, or any other communication mechanisms. Further, any suitable combination of wired and/or wireless components and systems may provide network 150. Moreover, network 150 may be embodied using bi-directional, unidirectional, or dedicated networks. Communications through network 150 may also operate with standard transmission protocols, such as Transmission Control Protocol/Internet Protocol (TCP/IP), Hyper Text Transfer Protocol (HTTP), SOAP, RPC, or other protocols.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present disclosed embodiments may be implemented in various environments. Such environments and related applications may be specially constructed for performing the various processes and operations according to the disclosed embodiments or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the disclosed embodiments, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Moreover, although the subject matter described above was described with respect to systems 100 and 200, the subject matter described herein may be used to determine the benefit of any distributed processing system including one or more clusters or portions of clusters.

The foregoing description is intended to illustrate but not to limit the scope of the invention, which is defined by the scope of the appended claims. Other embodiments are within the scope of the following claims.

What is claimed:

1. A computer-implemented method comprising:

accessing, at a static cluster system, information representative of the static cluster system;

accessing information representative of a dynamic cluster system;

determining, based on the accessed information, a value representative of a benefit of implementing the dynamic cluster system rather than the static cluster system, wherein the benefit is determine as the cost associated with the static cluster system based on the following equation:

$C_{trad}=(n*T_{tdg}*C_t)+(n*T_{tci}*C_t)+(n*T_{tdi}*C_t)$, wherein n represents a quantity of moves detected in the static cluster system; $T_{tdg}$ represents a first time to move a database instance of the static cluster system; $C_t$ represents a cost value per unit of time; $T_{tci}$ represents a second time to move a central instance in the static cluster system; and $T_{tdi}$ represents a third time to move a dialog instance in the static cluster system; and providing the determined value to a user interface, wherein at least one processor performs at least one of the accessing information at the static cluster system, the accessing information representative of a dynamic cluster system, the determining, and the providing.

2. The computer-implemented method of claim 1, wherein determining further comprises:

determining the second cost associated with the dynamic cluster system based on the following equation:

$C_{ada}=(n*T_{adb}*C_t)+(n*T_{aci}*C_t)+(n*T_{adi}*C_t)+C_{once}$, wherein $T_{adb}$ represents a fourth time to move a database in a dynamic cluster system; $T_{aci}$ represents a fifth time to move a central instance in a dynamic cluster system; and $T_{adi}$; represents another time to move a dialog instance in a dynamic cluster system.

3. The computer-implemented method of claim 2, wherein determining further comprises:

determining a cost reduction based on the following equation:

$C_{red}=C_{trad}-C_{ada}$.

4. The computer-implemented method of claim 1, wherein accessing, at the static cluster system, further comprises:

accessing a registry of the static cluster system to obtain information of activity within the static cluster system.

5. The computer-implemented method of clam 1, wherein accessing, at the static cluster system, further comprises:

accessing information representative of another static cluster system comparable to the static cluster system.

6. The computer-implemented method of claim 1, wherein accessing information representative of the dynamic cluster system, further comprises:

accessing a registry of the dynamic cluster system to obtain information of activity within the dynamic cluster system.

7. The computer-implemented method of claim 1, wherein accessing information representative of the dynamic cluster system, further comprises:

accessing information representative of another dynamic cluster system comparable to the static cluster system.

8. The computer-implemented method of claim 1 further comprising:

implementing the dynamic cluster system to include a central instance to manage the dynamic cluster system, a network attached server to provide instances of applications, and one or more cluster nodes; and implementing the static cluster system to include a central instance to manage the static cluster system and one or more cluster nodes.

9. The computer-implemented method of claim 1 further comprising: measuring at a node at least one of the first time, the second time, the third time, the fourth time, and the fifth time; and measuring the first time, the second time, the third time, the fourth time, and the fifth time as a same time or a different time.

10. A non-transitory computer-readable storage medium containing instructions to configure a processor to perform a method, the method comprising:

accessing, at a static cluster system, information representative of the static cluster system;

accessing information representative of a dynamic cluster system;

determining, based on the accessed information, a value representative of a benefit of implementing the dynamic cluster system rather than the static cluster system, wherein the benefit is determine as the cost associated with the static cluster system based on the following equation:

$$C_{trad}=(n*T_{tdg}*C_t)+(n*T_{tci}*C_t)+(n*T_{tdi}*C_t), \text{ wherein}$$

n represents a quantity of moves detected the static cluster system; $T_{tdg}$ represents a first time to move a database instance of the static cluster system; $C_t$ represents a cost value per unit of time; $T_{tci}$ represents a second time to move a central instance in the static cluster system; and $T_{tdi}$ represents a third time to move a dialog instance in the static cluster system; and providing the determined value to a user interface.

11. The non-transitory computer-readable medium of claim 10, wherein determining further comprises:

determining the second cost associated with the dynamic cluster system based on the following equation:

$$C_{ada}=(n*T_{adb}*C_t)+(n*T_{aci}*C_t)+(n*T_{adi}*C_t)+C_{once},$$
wherein $T_{adb}$ represents a fourth time to move a database in a dynamic cluster system; $T_{aci}$ represents a fifth time to move a central instance in a dynamic cluster system; and $T_{adi}$ represents another time to move a dialog instance in a dynamic cluster system.

12. The non-transitory computer-readable medium of claim 11, wherein determining further comprises:

determining a cost reduction based on the following equation:

$$C_{red}=C_{trad}-C_{ada}.$$

13. The non-transitory computer-readable medium of claim 10, wherein accessing, at the static cluster system, further comprises:

accessing a registry of the static cluster system to obtain information of activity within the static cluster system.

14. A system comprising:

a processor; and a memory, wherein the processor and the memory are configured to perform a method comprising:

accessing, at a static cluster system, information representative of the static cluster system;

accessing information representative of a dynamic cluster system;

determining, based on the accessed information, a value representative of a benefit of implementing the dynamic cluster system rather than the static cluster system, wherein the benefit is determine as the cost associated with the static cluster system based on the following equation:

$$C_{trad}=(n*T_{tdg}*C_t)+(n*T_{tci}*C_t)+(n*T_{tdi}*C_t), \text{ wherein}$$

n represents a quantity of moves detected in the static cluster system; $T_{tdg}$ represents a first time to move a database instance of the static cluster system; $C_t$ represents a cost value per unit of time; $T_{tci}$ represents a second time to move a central instance in the static cluster system; and $T_{tdi}$ represents a third time to move a dialog instance in the static cluster system; and providing the determined value to a user interface.

* * * * *